United States Patent
Hosseini et al.

[11] Patent Number: 5,941,358
[45] Date of Patent: Aug. 24, 1999

[54] END-OF-FILL DETECTOR ARRANGEMENT FOR A FLUID ACTUATED CLUTCH

[75] Inventors: Javad Hosseini, Edelstein; Gregory A. Menke, East Peoria; Bradley K. Mc Cunn, Peoria; Daniel J. Whiting, Bloomington; Pei-Ming Chang, Peoria, all of Ill.

[73] Assignee: Caterpillar Inc., Peoria, Ill.

[21] Appl. No.: 08/991,802

[22] Filed: Dec. 16, 1997

[51] Int. Cl.$^6$ .................................................. F16D 25/10
[52] U.S. Cl. .................................. 192/85 R; 192/87.13; 192/87.18; 192/3.58
[58] Field of Search .............................. 192/87.13, 87.18, 192/87.14, 87.19, 109 F, 52.4, 18 B, 48.7, 85 R, 87.1, 3.58

[56] References Cited

U.S. PATENT DOCUMENTS

| | | | |
|---|---|---|---|
| 4,465,168 | 8/1984 | Sato | 192/3.57 |
| 4,507,976 | 4/1985 | Banko | 73/861.54 |
| 4,620,560 | 11/1986 | Coutant | 192/109 F X |
| 4,730,708 | 3/1988 | Hamano et al. | 192/109 F X |
| 5,035,312 | 7/1991 | Asayama et al. | 192/85 R |
| 5,054,599 | 10/1991 | Marcott | 192/85 R |
| 5,119,697 | 6/1992 | Vukovich et al. | 74/867 |
| 5,168,973 | 12/1992 | Asayama et al. | 192/85 R |
| 5,197,508 | 3/1993 | Gottling et al. | 137/1 |
| 5,216,606 | 6/1993 | Lentz et al. | 364/424.1 |
| 5,217,097 | 6/1993 | Lasoen | 192/3.58 |
| 5,251,443 | 10/1993 | Ehrlinger et al. | 192/85 R X |
| 5,343,994 | 9/1994 | Kyrtsos | 192/85 R |
| 5,417,622 | 5/1995 | Asayama et al. | 477/63 |
| 5,467,854 | 11/1995 | Creger et al. | 192/87.18 |
| 5,505,100 | 4/1996 | Mitchell et al. | 74/335 |
| 5,551,930 | 9/1996 | Creger et al. | 477/130 |
| 5,580,332 | 12/1996 | Mitchell et al. | 477/143 |

FOREIGN PATENT DOCUMENTS

| | | | |
|---|---|---|---|
| 57-200730 | 12/1982 | Japan | 192/87.1 |
| 1-156147 | 1/1989 | Japan | 192/87.1 |

OTHER PUBLICATIONS

K–Atomics Komatsu–Advanced Transmission with Optimum Modulation Control Technical Guide, 1989.

*Primary Examiner*—Charles A Marmor
*Assistant Examiner*—Ha Ho
*Attorney, Agent, or Firm*—J. W. Burrows; John W. Morrison

[57] ABSTRACT

An end-of-fill detection arrangement is provided in a power distribution system to detect when a clutch is fully filled and the pressure therein can be progressively increased to full engagement. The arrangement includes placing a position sensor in a pressure relief valve that is controlling the desired pressure level to respective clutches and directing the sensed position of the valving element therein to an electronic controller. The controller monitors the position of the valving element in the relief valve. Initiation of filling of a clutch results in the valving element moving from a bypassing position towards a flow blocking position. This movement is noted by the controller and when the valving element returns generally to its initial location, the clutch is filled. The controller notes the end-of-fill and provides a command signal to the proportional valve to progressively increase the pressure in the clutch until the clutch is fully engaged. The subject invention provides a simple arrangement that detects the end-of-fill.

12 Claims, 3 Drawing Sheets

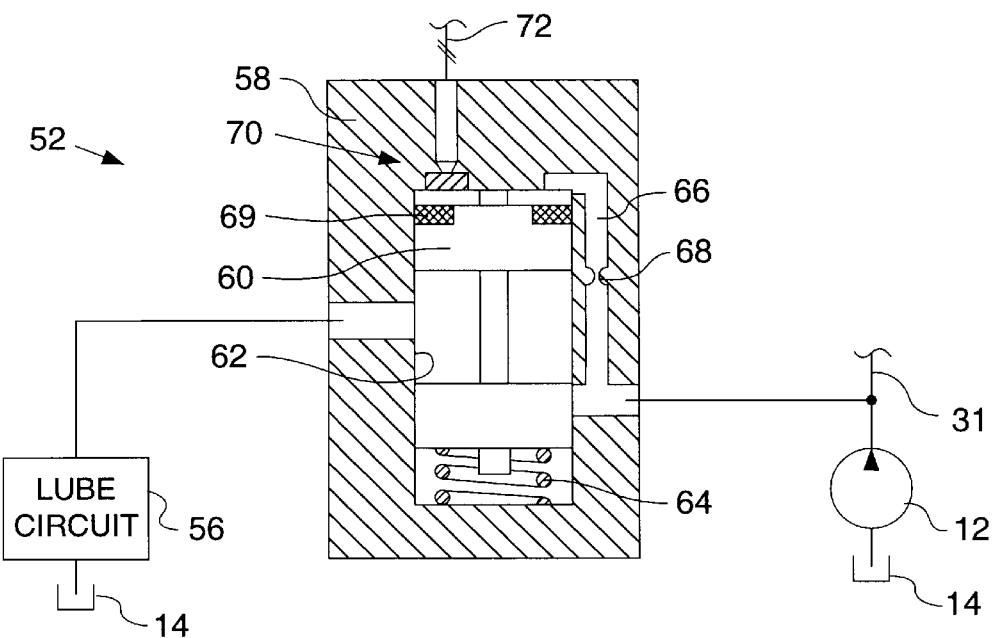
Fig_2_
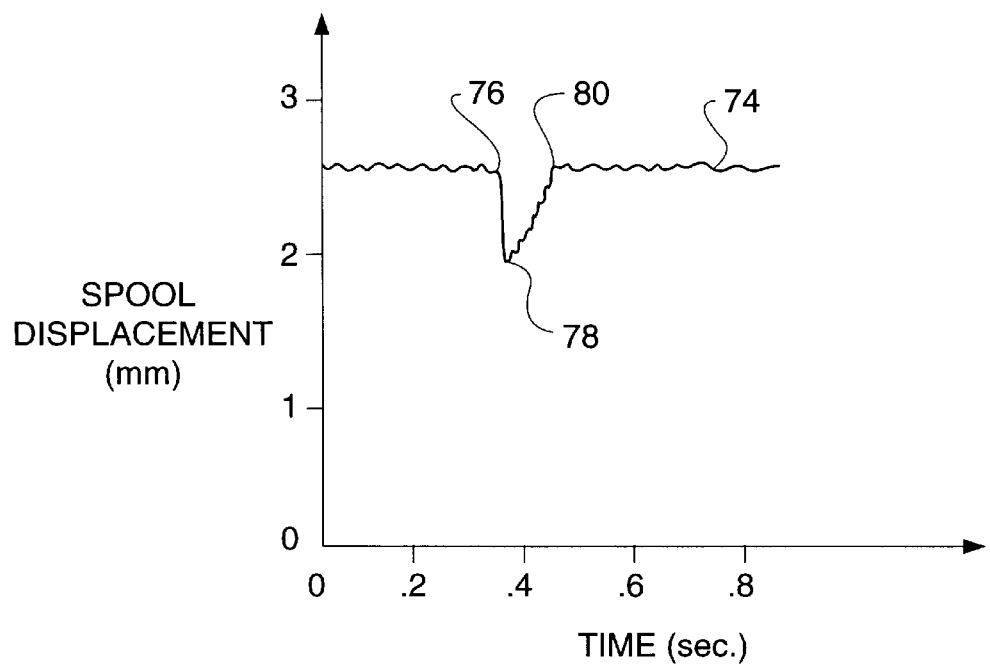
Fig_3_

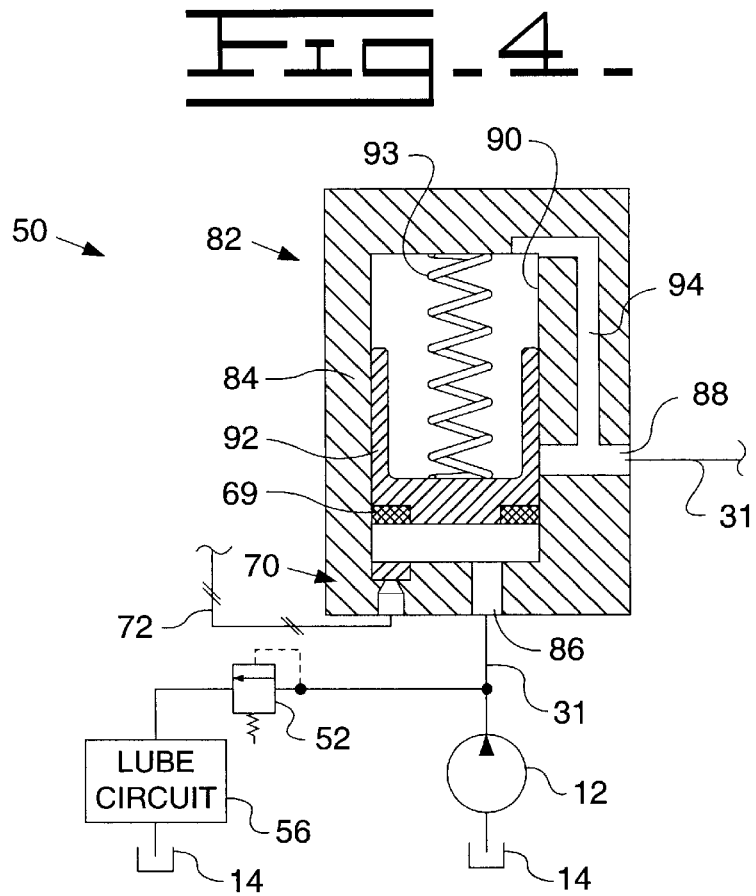
Fig-4-
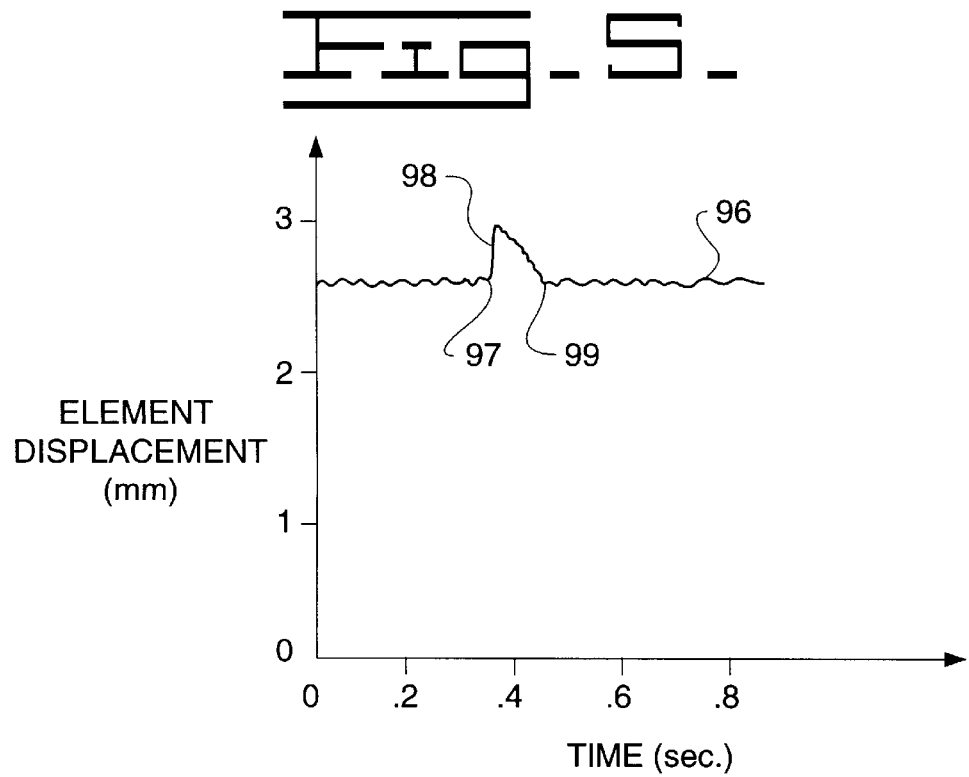
Fig-5-

END-OF-FILL DETECTOR ARRANGEMENT FOR A FLUID ACTUATED CLUTCH

TECHNICAL FIELD

This invention relates generally to detecting when the end-of-fill occurs in hydraulic clutches and more particularly to using the movement of the valving element within the pressure relief valve to provide a signal representative c,f the end-of-fill.

BACKGROUND ART

There are various arrangements known in the art to detect end-of-fill. Each is designed to detect the end-of-fill so that the pressure to the hydraulic clutch can then be progressively increased to fully engage the hydraulic clutch thus eliminating harsh engagement of the hydraulic clutch. Harsh engagement of the hydraulic clutch results in a torque spike through the driveline of the machine, causing "jerk". This jerk is uncomfortable to the operator and also reduces the life expectancy of associated components within the powertrain of the machine.

One of the known arrangements uses a separate flow sensing valve having an electrical switch disposed thereon. The flow through the flow sensing valve is directed across a fixed orifice to the associated hydraulic clutch. Once the flow through the valve and across the fixed orifice ceases, the absence of a pressure drop across the fixed orifice permits the flow sensing valve to return to a spring biased, flow blocking position. Once the flow sensing valve reaches its spring biased position, it makes contact with an electrical switch which sends a signal to the controller indicating that the clutch is filled. This arrangement requires all flow to till the clutch be directed across a fixed orifice and also through a separate flow sensing valve. Likewise this arrangement is required for each clutch in the system.

Other known end-of-fill arrangements rely on controlling the amount of time that the flow of fluid is being directed to the clutch during filling or by controlling the fluid flow rate over a set period of time. These arrangements do not account for variances in control valves and/or clutch actuating chambers. In order to compensate for these problems, various control schemes have been devised to learn from previous clutch fills and adaptively change the fill time in order to ensure that the clutch is filled at the proper time prior to increasing the pressure to fully engage the clutch. These arrangements also require calibration of the clutches following installation which is time consuming and need special calibration schemes.

In other known end-of-fill detection systems that rely on electrical actuation of the control valve to direct fluid to fill the clutch, a controller monitors the electrical signal used to actuate the control valve. When the actuating chamber of the clutch is full, the increase in pressure acts on the control valve to move it back to a flow blacking position. The force acting to move the control valve back towards the flow blocking position is acting against the electrical force that moved the control valve to the flow passing position. This creates an electrical voltage spike which is detected by the controller. This voltage spike represents the end-of-fill. This end-of-fill detection arrangement requires a control scheme for each of the clutch control valves to detect end-of-fill in the respective clutches.

The present invention is directed to overcoming one or more of the problems as set forth above.

DISCLOSURE OF THE INVENTION

In one aspect of the present invention an end-of-fill detection arrangement is provided for use in power distribution systems of machines having fluid actuated clutches. The power distribution system includes a source of pressurized fluid, a reservoir, a plurality of fluid actuated clutches connected to the source of pressurized fluid through respective ones of a plurality of control valves, and an electronic controller operative to receive a signal from an input mechanism and direct command signals to the respective ones of the plurality of control valves to control the filling and progressive engagement of the associated ones of the plurality of fluid actuated clutches. The end-of-fill detecting arrangement includes a pressure relief valve having a valving element spring biased to a flow blocking position. The pressure relief valve is connected between the source of pressure fluid and the reservoir and operative to bypass fluid flow from the source of pressurized fluid to the reservoir in order to control the desired operating pressure level of the fluid flow being directed to the respective fluid actuated clutches. The arrangement also includes a position sensor that is disposed on the pressure relief valve and operative to sense the position of the valving element in the pressure relief valve during operation. A signal representative of the valving element position is directed from the position sensor to the electronic controller. The controller detects the end-of-fill in response to the valving element returning generally to its initial operating position subsequent to it moving a distance greater than a predetermined distance towards the flow blocking position.

In another aspect of the subject invention, a method is provided to detect the end-of-fill of a fluid actuated clutch used in a power distribution system. The power distribution system includes a source of pressurized fluid, a reservoir, a plurality of fluid actuated clutches connected to the source of pressurized fluid through respective ones of a plurality of control valves. The system also includes an electronic controller operative to receive a signal from an input mechanism and direct command signals to the respective ones of the plurality of control valves to control the filling and progressive engagement of the associated ones of the plurality of fluid actuated clutches. The method steps include providing a pressure relief valve connected between the source of pressurized fluid and the reservoir, sensing the position of a valving element in the pressure relief valve during pressure relieving operation and directing a signal representing the position of the valving element to the electronic controller. The steps also include directing a command signal from the electronic controller to the appropriate one of the control valves to fill and progressively actuate the associated fluid operated clutch, detecting the movement of the valving element in the pressure relief valve towards the flow blocking position and detecting the point at which the valving element in the pressure relief valve returns to a position generally the same as the initial operating position. This point represents the end-of-fill of the fluid actuated clutch.

BRIEF DESCRIPTION OF THE DRAWINGS

FIG. 2 is a diagrammatic representation of a relief valve used in the clutch actuating system of FIG. 1;

FIG. 3 is a graph representing the movement of the valving element within the relief valve relative to time;

FIG. 4 is a diagrammatic representation of another embodiment of the subject invention; and FIG. 5 is a graph representing the movement of the valving element within the flow responsive valve relative to time.

BEST MODE FOR CARRYING OUT THE INVENTION

Figure 1:
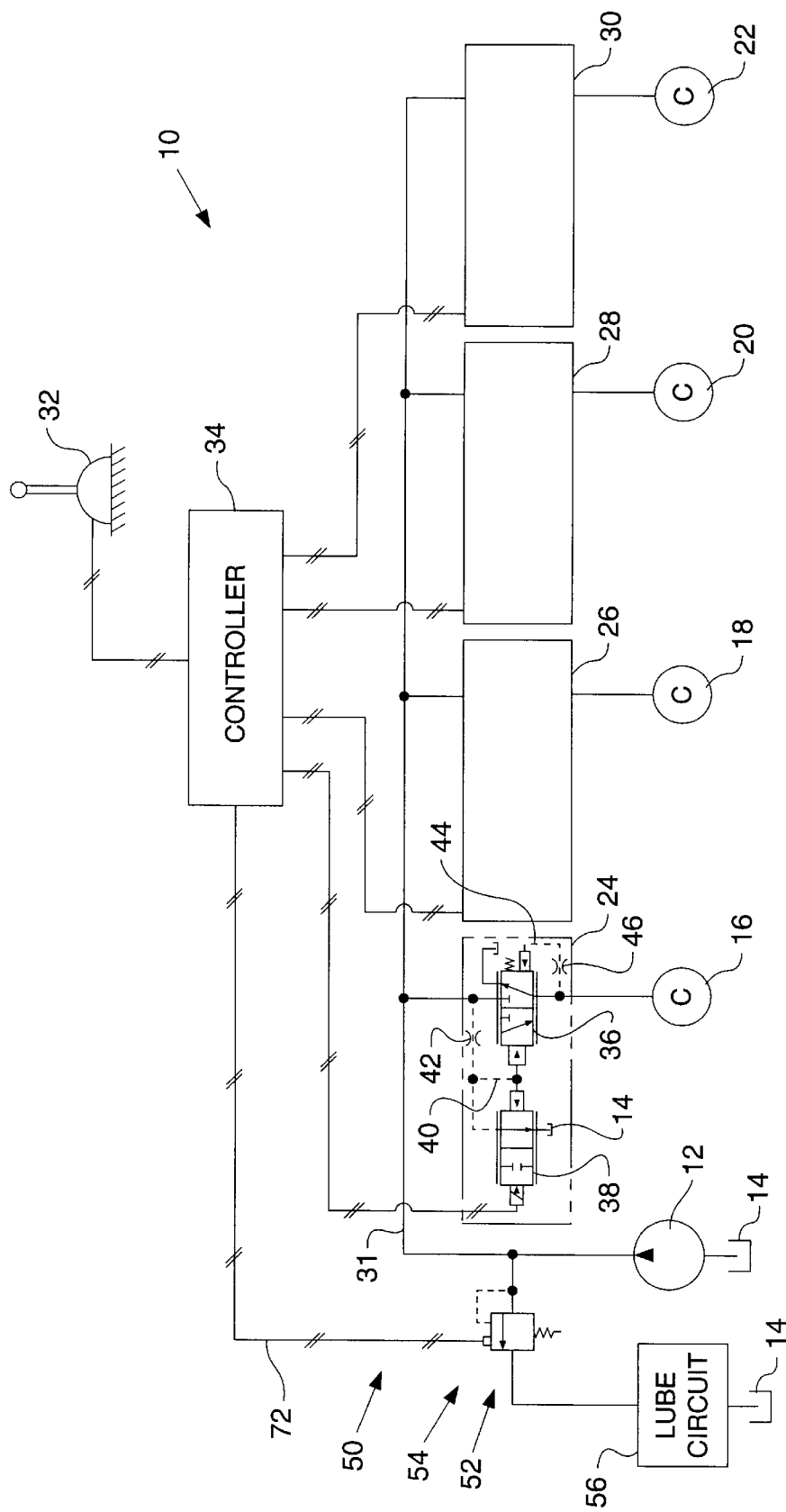
FIG. 1 is a schematic representation of a clutch actuating system including an embodiment of the subject invention.

Referring to the drawings and more particularly to FIG. 1, a power distribution system 10 is illustrated and includes a source of pressurized fluid, such as a pump 12, a reservoir 14, a plurality of fluid actuated clutches 16,18,20,22 connected to the pump 12 through respective ones of a plurality of control valves, such as proportional control valves 24,26, 28,30. A supply conduit 31 connects the pump 12 to the respective ones of the plurality of control valves 24,26,28, 30. As is well known in the art, fluid actuated clutches require a volume of fluid to initially fill an actuating chamber and displace a piston moving it towards the clutch discs and plates, also called the clutch pack. During this movement, as the piston encounters the retraction springs and resistance increases, the volume of fluid needed is reduced as the pressure increases. Once the piston "touches up" to the clutch pack, the clutch is full of fluid and end-of-fill has been reached.

The system also includes an input mechanism 32 operative to generate and direct a signal to an electronic controller 34 that is representative of a desired direction and speed ratio. The electronic controller 34 processes the signal from the input mechanism 32 and directs a command signal to the appropriate control valve 24/26/28/30 to fill and subsequently progressively engage the associated fluid actuated clutch 16/18/20/22. In autoshift transmissions, the shift is based on the position of the input mechanism and the transmission output speed.

Each of the proportional control valves 24,26,28,30 are the same in construction. Consequently only one of them will be described herein. Each is operative to control the pressure within the associated fluid actuated clutch 16,18, 20,22 in proportion to the magnitude of the command signal received from the electronic controller 34. The proportional control valve 24 generally includes a two-position, three-way pilot operated valve 36 and a two-position, two-way solenoid actuated valve 38. The pilot operated valve 36 is spring biased to a first position at which the clutch 16 is in open communication with the reservoir 14 and the pressurized fluid from the pump 12 is blocked. The pilot operated vale 36 is movable towards the second position at which the pump 12 is in fluid communication with the clutch 16 and communication with the reservoir 14 is blocked. The pilot operated valve 36 is movable towards the second position in response to pressurized fluid in a pilot conduit 40 that is in communication with the pump 12 through an orifice 42. The pilot operated valve 36 is also urged towards its first position by the force of the pressurized fluid in a conduit 44 that is in communication with the clutch 16 through an orifice 46. It is recognized that the orifice 46 is optional and could be deleted.

The solenoid operated valve 38 is biased to its first position by the force of the pressurized fluid in the pilot conduit 40. At the first position, the pilot conduit 40 is in open communication with the reservoir 14 and movable towards its second, flow blocking position in response to the command signal received from the controller 34. It is recognized that other types of proportional valves could be used without departing from the essence of the subject invention. It is only necessary that the proportional valve be operative in response to a command signal to fill the clutch and to subsequently progressively increase the pressure within the clutch to a desired maximum level that fully engages the clutch.

An end-of-fill detection arrangement 50 is provided to detect the point at which the clutch is full of fluid and the increase in pressure therein can be smoothly initiated. The end-of-fill detection arrangement 50 includes a pressure relief valve 52 connected between the pump 12 and the reservoir 14 and a position sensor 54 disposed in the pressure relief valve. In the subject embodiment, a lube circuit 56 is disposed between the pressure relief valve 52 and the reservoir 14. As is well known, the flow of fluid being bypassed across the relief valve 52 is directed through the lube circuit 56 to be used as, for example, a coolant and/or a lubricate. It is recognized that the flow could also be directed through a cooler and the torque converter as well as the lube circuit 56.

Referring to FIG. 2, the pressure relief valve 52 includes a housing 58 having a valving element 60 slideably disposed in a bore 62 defined in the housing 58. The valving element 60 is biased to a first, flow blocking position by a spring 64 and movable towards a second, flow passing position in response to pressurized fluid from the pump 12 being directed to the end thereof opposite the spring 64. The pressurized fluid from the pump 12 is directed to the end opposite the spring 64 through a pilot conduit 66 having an orifice 68 disposed therein. It is recognized that the conduit 66 and the orifice 68 could be within the spool 60 without departing from the essence of the subject invention. In the subject embodiment, the housing 58 and the valving element 60 are both made from a non-ferrous material.

The position sensor 54 defined in the pressure relief valve 52 includes a magnet 69 disposed on the end of the valving element 60 opposite to the spring 64 and a hall effect transducer 70 disposed in the housing 58 generally adjacent the magnet 69. The position sensor 54 is operative to generate and deliver, through an electrical line 72, a signal representative of the position of the valving element 60 to the electronic controller 34. It is recognized that if the housing 58 and valving element 60 were made from a ferrous material, an inductive proximity sensor or other types of position sensors could be used to determine the position of the valving element 60 without departing from the essence of the subject invention.

Referring to FIG. 3, a chart is illustrated to show the relationship of the position of the valving element 60 relative to time as one of the clutches is being filled. The vertical axis represents the position of the valving element 60 from its first, spring biased blocking position towards its open, flow passing position. The horizontal axis represents increments of time. A portion of a line 74 generally represents the position of the valving element 60 during a portion of its operation when one of the fluid actuated clutches 16,18,20,22 is being filled.

A point 76 on the line 74 indicates when filling of the clutch is initiated. As illustrated, since a portion of the fluid flow is being directed to the clutch to fill the clutch, the valving element 60 in the pressure relief valve 52 moves towards the first, flow blocking position. The first volume of fluid is used to initially fill the actuating chamber of the clutch. As illustrated at a point 78, as the elements within the clutch move closer together, the volume of fluid needed to move the elements into intimate contact is less. Consequently, more flow must be directed across the relief valve 52. In order to bypass more fluid across the relief valve 52, the valving element 60 must move back towards its open, flow passing position. Once the valving element 60 reaches a position generally indicated by a point 80, the end-of-fill is reached and the progressive increase of the pressure within the clutch can commence. At the point 80, the valving element 60 has returned to the flow blocking position.

Referring to FIG. 4, another embodiment of the subject invention is disclosed. Like elements have like element numbers. The relief valve 52 used in this embodiment is a typical well known relief valve. The end-of-fill detection arrangement 50 of the subject embodiment includes a flow responsive valve 82 disposed in the supply conduit 31 upstream of the plurality of control valves 24,26,28,30. The flow responsive valve 82 includes a housing 84 having an inlet port 86 connected to the pump 12, an outlet port 88 connected to the plurality of control valves and a bore 90 defined therein. A valving element 92 is slideably disposed in the bore 90 and biased by a spring 93 to a position at which flow between the inlet and outlet ports 86,88 is blocked. The valving element 92 is movable to a flow communicating position in response to flow in the supply conduit 31 from the pump 12 to any one of the plurality of control valves 24,26,28,30. A feedback passage 94 is provided to direct the pressurized fluid downstream of the valving element 92 to the spring chamber.

The position sensor 54 that was clearly set forth with respect to FIGS. 1 & 2 is being utilized in the subject embodiment. The magnet 69 is disposed on the valving element 92 on the end thereof opposite to the spring 93 and the hall effect transducer 70 is disposed in the housing 84 generally adjacent the magnet 69. As with the position sensor 54 of FIG. 1, the signal representing the position of the valving element 92 is deliver through the electrical line 72 to the controller 34.

Referring to FIG. 5, a chart is illustrated to show the relationship of the position of the valving element 92 of FIG. 4 relative to time as one of the clutches is being filled. The vertical axis represents the position of the valving element 60 from its first, spring biased blocking position towards its open, flow passing position. The horizontal axis represents increments of time. A portion of a line 96 generally represents the position of the valving element 60 during a portion of its operation when all of the control valves 24,26,28,30 are in their neutral, flow blocking positions.

A point 97 on the line 96 indicates initial filling of one of the clutches by opening one of the control valves. The drop in pressure downstream of the flow responsive valve 84 results in the valving element 92 moving against the bias of the spring 93 to permit flow to pass from the inlet port 86 to the outlet port 88. This is generally indicated by the line 98. As the elements within the clutch move closer together, the volume of fluid needed to move the elements into intimate contact is less. Consequently, the valving element 92 moves to reduce the flow thereacross. One the valving element 92 reaches a position generally indicated by a point 99, the end-of-fill is reached and the progressive increase of the pressure within the clutch can commence.

It is recognized that the times noted in FIG. 3 could be varied depending on system requirements and that the displacement of the valving element 60 for full bypass could also be varied depending on the size of the valve. Likewise, the amount of movement of the valving element 60 following initiation of fill could vary depending on the volume of fluid that needs to be bypassed and/or the pressure at which the fluid is being bypassed. Additionally, even though the plurality of control valves are illustrated as proportional valves, it is recognized that they could be other types of control valves without departing from the essence of the invention.

Industrial Applicability

During the operation of the power distribution system 10 of the embodiment disclosed in FIGS. 1 and 2, with the input mechanism 32 in its neutral position, all of the flow from the pump 12 is being bypassed across the relief valve 52 to the reservoir 14 at a predefined pressure level. It is recognized that a small amount of fluid is lost due to leakage through the proportional valves and the clutches. The position sensor 54 delivers the sensed position of the valving element 60 to the electronic controller 34. As indicated in FIG. 3 by the horizontal portion of the line 74, the position of the valving element 60 in the relief valve 52 is at approximately 2.5 mm from the spring biased first, flow blocking position. The flow being bypassed across the relief valve 52 is passed through the lube circuit 56 to the reservoir 14 in a conventional manner.

In order to place or change the power distribution system 10 into a power delivery mode, a desired input is made through the input mechanism 32 in order to establish a desired direction and gear ratio. The electronic controller 34 receives the input signal from the input mechanism 32 and directs a command signal to the appropriate one of the proportional control valves 24/26/28/30 to initiate filling of the associated clutch 16/18/20/22.

The command signal from the electronic controller 34 moves the solenoid actuated valve 38 towards its second position at which pressurized fluid in the conduit 40 to the reservoir 14 is blacked and the pressurized fluid in the conduit 40 acts to move the pilot operated valve 36 to its flow passing position which directs flow to the associated clutch. Once the pilot operated valve 36 is in its second position, fluid from the pump 12 takes the path of least resistance and immediately begins to fill the clutch. Since the fluid flow from the pump 12 is being directed to an area of low pressure, the valving element 60 in the relief valve 52 moves towards its flow blocking position as indicated at the point 76 on the line 74 of FIG. 3.

As is well known, as the flow enters into the actuating chamber of the clutch, the flow moves the piston therein to engage the clutch pack. As the piston in the actuating chamber moves to engage the clutch pack, resistance increases which slows the piston movement thus requiring less flow.

Once the position of the spool reaches the point 80, the piston has "touched up" to the clutch pack, with no gaps between each successive clutch disc and plate. This is the point at which the clutch is completely filled and is in condition for the pressure therein to progressively increase to full engagement. The point at which the clutch is completely filled and no more oil can flow into the clutch is the end-of-fill. The electronic controller 34 detects this end-of-fill through the detection arrangement 50 and proceeds to initiate the progressive increase in pressure to fully engage the clutch.

In many systems, at least two clutches have to be changed/engaged to provide motive power. In the subject invention, only one of the two clutches needs to be changed/engaged in order to change the gear ratio. In order to provide a smooth transition between gear ratios, the subject end-of-fill detection arrangement provides the method and apparatus to detect when the on-coming clutch is totally filled so that the increase of pressure therein does not happen prematurely or late. Premature engagement pressure results in a jolt or jerk to the machine while late engagement pressure results in unnecessary slippage of the elements within the clutch. The end-of-fill detection is also used to initiate the timing for disengagement of the off-going clutch.

During the operation of the embodiment disclosed in FIG. 4, with the input mechanism 32 in its neutral position, all of the flow from the pump 12 is being bypassed across the relief valve 52 to the reservoir 14 at a predefined pressure level. Initially, the flow from the pump 12 acts on the valving element 92 of the flow responsive valve 82 moving it against the bias of the spring 93 and directs pressurized fluid to the plurality of control valves 24,26,28,30. Since each of the control valves are in their neutral flow blocking positions, flow through the supply conduit 31 ceased. The pressure of the fluid at the control valves is directed through the feedback passage 98 and in combination with the force of the spring 93 moves the valving element 92 to the position illustrated in FIG. 4. At this position, the pressure of the fluid at the control valves is maintained and the flow from the pump 12 is bypassed to the reservoir 14 across the relief valve 52.

At this neutral condition, the flow through the flow responsive valve 82 is zero. The position of the valving element 92, as sensed by the position sensor 54 and delivered to the controller 34, can be related to the straight, horizontal portion of the line 96 in FIG. 5. Once one of the control valves 24,26,28,30 is actuated, flow through the conduit 31 is initiated. This is represented by the line 98 of FIG. 5. As the appropriate clutch nears being filled, the volume of fluid required reduces. Once the position of the valving element 92 reaches the point 99 illustrated in FIG. 5, the clutch has reached its end-of-fill. The electronic controller 34 detects this end-of-fill through the detection arrangement 50 and proceeds to initiate the progressive increase in pressure to fully engage the clutch.

In view of the foregoing, it is readily apparent that the subject end-of-fill detection arrangement 50 acts to determine the end-of-fill in a simple and effective manner. By providing a position sensor in the pressure relief valve 52 of the power distribution system 10, extra valves and/or special control schemes are not needed. Additionally, the subject invention eliminates the need to calibrate the clutches in a new system or re-calibrate the clutches due to wear or replacement of a clutch, a proportional valve or a controller.

Other aspects, objects and advantages of this invention can be obtained from a study of the drawings, the disclosure and the appended claims.

We claim:

1. An arrangement for detecting an end-of-fill of fluid actuated clutches used in a power distribution system having a source of pressurized fluid, a reservoir, a plurality of fluid actuated clutches connected to the source of pressurized fluid through respective ones of a plurality of control valves, and an electronic controller operative to receive a signal from an input mechanism and direct command signals to the respective ones of the plurality of control valves to control the filling and progressive engagement of the associated ones of the plurality of fluid actuated clutches, the end-of-fill detecting arrangement comprising:

a flow responsive valve having a valving element movable between a flow blocking position and a flow passing position, the flow responsive valve being connected to the source of pressurized fluid and operative to direct flow to all of the respective fluid actuated clutches when the valving element is in the flow blocking position and direct flow to the reservoir when the valving element is in the flow passing position; and a position sensor disposed on the flow responsive valve and operative to sense the position of the valving element in the flow responsive valve during operation and to direct a signal representative of the valving element position to the electronic controller, wherein:

the valving element moves from the flow passing position to the flow blocking position in response to one of the plurality of clutches filling with fluid, the valving element returns to the flow passing position in response to the one of the plurality of clutches reaching the end-of-fill, and the controller detects the end-of-fill responsive to a signal from the position sensor indicating the return of the valving element to the flow passing position.

2. The arrangement of claim 1 wherein the flow responsive valve is a pressure relief valve connected between the source of pressurized fluid and the reservoir and operative to bypass fluid flow from the source of pressurized fluid to the reservoir in order to control the desired pressure level of the fluid flow being directed to the respective fluid actuated clutches.

3. The arrangement of claim 2 wherein the pressure relief valve has a housing made of a non-ferrous material and the valving element is a non-ferrous material, and the position sensor includes a magnet attached to the valving element and a hall effect transducer is disposed in the housing generally adjacent to the magnet.

4. The arrangement of claim 3, further including a spring which biases the valving element toward the flow passing position, wherein the magnet is attached to the valving element on the end thereof opposite to the spring.

5. The arrangement of claim 1 further including a supply conduit connecting the source of pressurized fluid to the plurality of control valves and the flow responsive valve is in fluid communication with the supply conduit between the source of pressurized fluid and the plurality of control valves.

6. The arrangement of claim 5 wherein the valving element in the flow responsive valve is movable towards the flow blocking position in response to actuation of one of the plurality of fluid actuated clutches.

7. The arrangement of claim 6 wherein the flow responsive valve has a housing made of a non-ferrous material and the valving element is a non-ferrous material, and the position sensor includes a magnet attached to the valving element and a hall effect transducer is disposed in the housing generally adjacent to the magnet.

8. A method of detecting end-of-fill of a fluid actuated clutch used in a power distribution system having a source of pressurized fluid, a reservoir, a plurality of fluid actuated clutches connected to the source of pressurized fluid through respective ones of a plurality of control valves, and an electronic controller operative to receive a signal from an input mechanism and direct command signals to the respective ones of the plurality of control valves to control the filling and progressive engagement of the associated ones of the plurality of fluid actuated clutches, the method of detecting end-of-fill comprises the following steps:

providing a flow responsive valve having a valving element and being connected to the source of pressurized fluid, the valving element being movable between a flow blocking position which directs flow to all of the respective fluid actuated clutches and a flow passing position which directs flow to the reservoir;

sensing the position of the valving element in the flow responsive valve during operation;

directing a signal representing the position of the valving element to the electronic controller;

directing a command signal from the electronic controller to one of the control valves to fill and actuate the associated fluid activated clutch;

detecting movement of the valving element from the flow passing position to the flow enabling position; and detecting the point at which the valving element in the flow responsive valve returns to the flow enabling position, this point represents the end-of-fill of the one of the fluid actuated clutches.

9. The method of claim 8 wherein in the step of providing a flow responsive valve, the flow responsive valve is a pressure relief valve connected between the source of pressurized fluid and the reservoir.

10. The method of claim 9 wherein the pressure relief valve has a housing made of a non-ferrous material and the valving element is made of a non-ferrous material, and the position sensor includes a magnet attached to the valving element and a hall effect transducer is disposed in the housing generally adjacent to the magnet.

11. The method of claim 8 wherein in the step of providing a flow responsive valve, the flow responsive valve is in fluid communication with a supply conduit between the source of pressurized fluid and the plurality of control valves.

12. The method of claim 11 wherein the valving element in the flow responsive valve is movable towards the flow blocking position in response to actuation of one of the plurality of fluid actuated clutches.

* * * * *